United States Patent [19]

Severinsson et al.

[11] Patent Number: 4,777,867
[45] Date of Patent: Oct. 18, 1988

[54] RELEASABLE SPRING RING DEVICE FOR A SPRING-OPERATED BRAKE ACTUATOR

[75] Inventors: Lars M. Severinsson, Hishult; Krister E. Ljung, Leifs; Fred S. Emilsson, Villa Solhem, Stora Slagarp, all of Sweden

[73] Assignee: Sab Nife AB, Landskrona, Sweden

[21] Appl. No.: 89,851

[22] Filed: Aug. 27, 1987

[30] Foreign Application Priority Data

Sep. 8, 1986 [SE] Sweden .............................. 8603745

[51] Int. Cl.⁴ .............................................. F01B 9/00
[52] U.S. Cl. .............................................. 92/29; 92/14; 92/21 MR; 188/170; 188/265
[58] Field of Search ................ 92/14, 29, 21 MR, 15, 92/17; 292/255.63, 256.65; 188/170, 265

[56] References Cited

U.S. PATENT DOCUMENTS

| | | | |
|---|---|---|---|
| 3,070,389 | 12/1962 | Bauer et al. | 292/256.65 |
| 3,918,346 | 11/1975 | Ziegler | 188/170 |
| 3,994,206 | 11/1976 | Kahlkvist et al. | 92/29 |
| 4,036,111 | 7/1977 | Dahlkvist et al. | 92/29 |
| 4,063,491 | 12/1977 | Roger et al. | 188/170 |
| 4,230,021 | 10/1980 | Aurousseau et al. | 92/29 |
| 4,280,398 | 7/1981 | Kerscher et al. | 92/29 |
| 4,364,305 | 12/1982 | Dalibout et al. | 92/29 |
| 4,472,995 | 9/1984 | Persson | 92/29 |
| 4,552,056 | 11/1985 | McKay | 92/29 |

FOREIGN PATENT DOCUMENTS 1083675 7/1958 Fed. Rep. of Germany ...... 188/265
8603745 9/1986 Sweden .

Primary Examiner—Robert E. Garrett
Assistant Examiner—Thomas Denion
Attorney, Agent, or Firm—Laurence R. Brown; Alfred J. Mangels

[57] ABSTRACT

A device for discontinuing and automatically restoring the operational function of a spring brake actuator. The device includes a piston with a piston rod and a spring for actuating the piston and piston rod in a working direction for brake application at falling brake fluid pressure on the piston. A slitted, resilient locking ring is arranged in grooves facing each other in the piston rod and a piston rod sleeve coaxial therewith. The locking ring can either be constrained to rest in both of the grooves, so that the piston rod and piston rod sleeve are locked together, or be free to be forced completely into one of the grooves, which is at least as deep as the thickness of the ring, so that the piston rod and piston rod sleeve are free to move independently of each other. In a compartment in a piston rod flange are arranged a movable locking yoke, which can engage heads at the respective ends of the ring for keeping them together, and a locking cube, which is movable by a control rod substantially perpendicularly to the yoke will move the yoke toward the locking ring and lock the yoke in engaging condition with the ring when the locking cube is above the yoke.

7 Claims, 2 Drawing Sheets

RELEASABLE SPRING RING DEVICE FOR A SPRING-OPERATED BRAKE ACTUATOR

TECHNICAL FIELD

This invention relates to a device for discontinuing and automatically restoring the operational function of a spring brake actuator, comprising a piston with a piston rod and a spring actuating the piston and piston rod in a working direction for brake application at falling brake fluid pressure on the piston, a slitted, resilient locking ring of the circlip type being arranged in grooves facing each other in the piston rod and a piston rod sleeve coaxial therewith.

BACKGROUND ART

A spring brake actuator is normally utilized for parking or emergency brake purposes.

A device of the kind described above—for obtaining a so called quick-release—is needed for the case that no fluid pressure is available for compressing the spring and thus for releasing the brakes and that the vehicle—preferably a rail vehicle—on which the actuator is mounted must be moved. Thus, the force transmitting path in the actuator from the spring to the member delivering its force from the actuator, in this case between the piston rod and the piston rod sleeve, must be broken by external, manual action but must be restored automatically at the return of brake fluid pressure for compressing the spring.

It is already known to employ a locking ring or spring ring for the general purpose set out above. In the design shown in the Swedish Patent Specification No. 7314474-3, especially FIGS. 4–6, the use of a spring ring is disclosed, although its purpose is different, namely to hold the actuator spring compressed in the absence of fluid pressure and automatically to release it at the return thereof.

However, in the present design the means for controlling the spring ring, based on the use of balls exerting an expanding force on the ring, are less developed and have certain disadvantages.

SUMMARY OF THE INVENTION

The purpose of the invention is to attain a device of the kind described above which is sturdy, reliable and cheap, and which further does not require much space and is externally operable with moderate effort.

This purpose is according to the invention attained in that externally operable, spring-biased control means at the slit of the locking ring are movable between a first position, in which the locking ring is constrained to rest in both of the grooves, so that the piston rod and piston rod sleeve are locked together, and a second position, in which the locking ring is free to be forced completely into one of the grooves, which is at least as deep as the thickness of the ring, so that the piston rod and piston rod sleeve are free to move independently of each other.

The disconnection of the rod and sleeve is hereby obtained by manually operating the control means, which are then spring-biased back for the automatic restoration of the connection.

For the purpose of transferring the locking ring to the groove being at least as deep as the thickness of the ring, when the control means have been operated, the ring has a tapered side surface cooperating with a corresponding tapered side surface of the other groove.

In a practical and preferred embodiment the control means include a locking yoke, which is movably radially relative to the locking ring and can engage heads at the respective ends of the ring for keeping them together, and a locking cube, which is movable substantially perpendicularly to the yoke to lock the yoke in the engaging condition when placed above the yoke. The control means are arranged in a compartment in a piston rod flange.

In order to take care of the force on the locking cube originating from the locking ring, the height of the compartment is such that the cube is supported by the end wall of the compartment in a yoke locking position.

The manual operation of the locking cube is preferably attained in that a control rod attached to the locking cube extends out of the piston rod flange, a compression spring being arranged around the control rod for accomplishing a spring bias on the cube into its yoke locking position.

As has already been mentioned, it is important to obtain a force-reduction of the manually operable member, i.e. the control rod. One such force-reduction step is achieved by the tapered side surface of the locking ring, as mentioned above. Further reductions to a desired level are attained in that on one hand the outer surfaces of the locking ring heads and the corresponding inner surfaces of the locking yoke and on the other hand the upper surface of the yoke and the corresponding lower surface of the locking cube are oblique or wedge-shaped.

For the purpose of enabling the compression spring around the control rod to move the locking cube back into position above the locking yoke, or in other words for the automatic restoration of the operational function of the spring brake actuator, at the return of fluid pressure for compressing the powerful spring in the actuator, the locking yoke and the locking cube are provided with corresponding bevelled or slanted surfaces.

BRIEF DESCRIPTION OF THE DRAWINGS

The invention will be described in further detail below reference being made to the accompanying drawings, in which.

DESCRIPTION OF THE PREFERRED EMBODIMENTS

Figure 1:
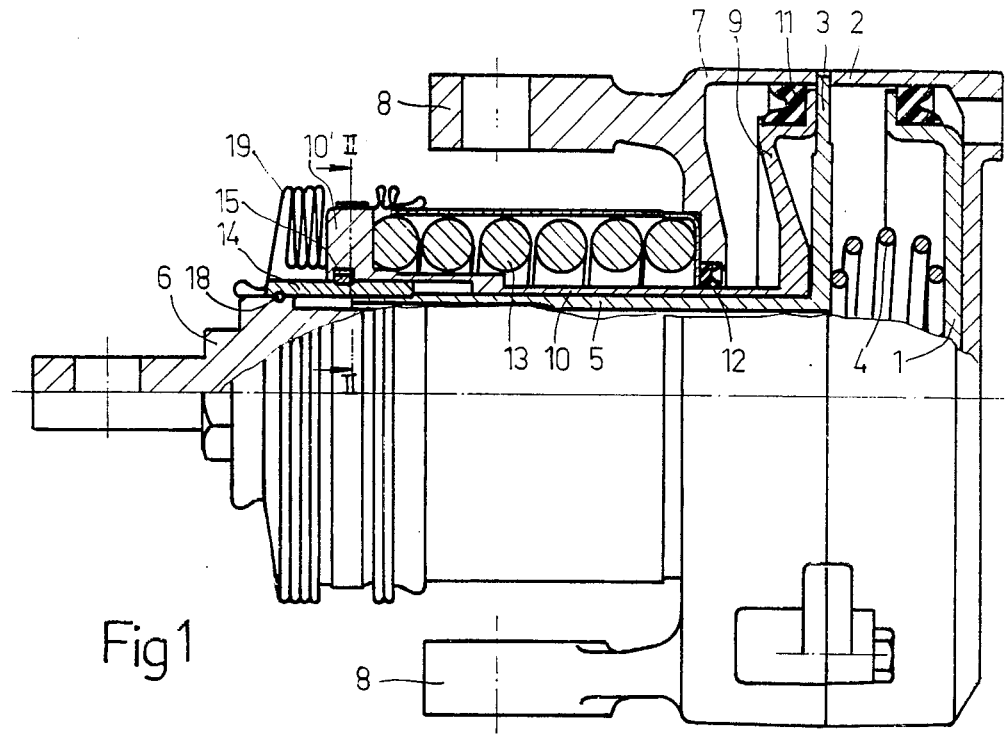
FIG. 1 is a side view, partly in section, of a combined brake unit and spring brake actuator incorporating the invention.
Figure 1A:
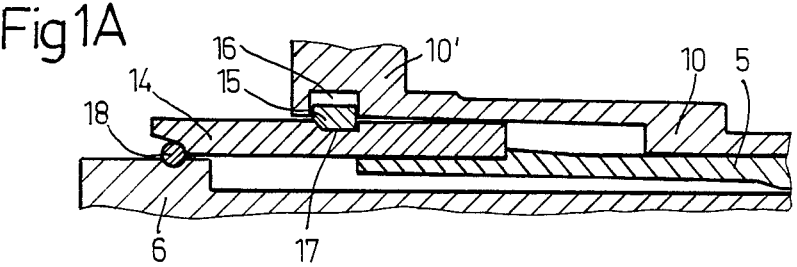
FIG. 1A is an enlarged part of FIG. 1 showing the most important details.
Figure 2:
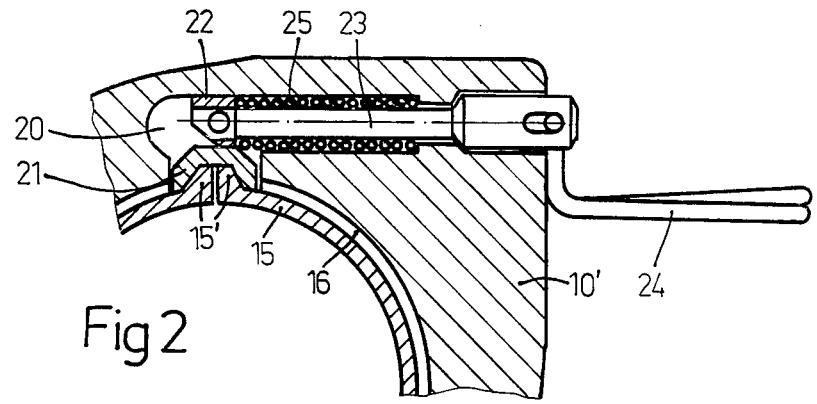
FIG. 2 is a cross-sectional view along the line II—II in FIG. 1, FIGS. 3 and 4 in a front view and a cross-sectional view, respectively, schematically illustrate a second embodiment of the invention, and FIGS. 5 and 6 in a front view and a cross-sectional view, respectively, schematically illustrate a third embodiment of the invention.

The embodiment shown in FIGS. 1, 1A and 2 is described in most detail due to its many advantages, whereas the two alternative embodiments according to FIGS. 3–6 are more briefly dealt with towards the end of the description. For a full understanding of the two alternative embodiments reference is also being made to FIGS. 1, 1A and 2 with accompanying description.

A combined rail vehicle brake unit and spring brake actuator is shown in FIG. 1.

A brake piston 1 is axially movable in a brake unit cylinder comprising a housing 2 and a bottom 3. A piston return spring 4 is as usual arranged between the piston 1 and the bottom 3. A tube-shaped, stationary member 5 is integral with the bottom 3 and houses a slack adjuster (not shown) of any conventional kind. An outgoing force-transmitting part 6 may be regarded as connected to the piston 1.

A spring brake actuator is combined with the brake unit so far described. The actuator has a cylinder-shaped housing 7 provided with brackets 8 for the mounting of the combined brake unit and actuator to a suitable part of a rail vehicle underframe (not shown). The two housings 2 and 7 are firmly joined together with the bottom 3 in a conventional way not described. A piston 9 with a piston rod 10 is axially movable in the cylinder-shaped housing 7. The piston 9 is provided with a seal 11, and a further seal 12 is arranged in the housing 7 against the piston rod 10. A forceful compression spring 13 of the helical type is arranged around the piston rod 10 between the housing 7 and a flange 10' on the piston rod 10.

The piston rod 10 is tubular and slidable on the cylindrical, stationary member 5. In order to transmit spring brake forces (for parking and emergency braking) from the compression spring 13 to the outgoing force-transmitting part 6 via the piston rod 10 there is provided an arrangement, most clearly shown to a larger scale in FIG. 1A: A piston rod sleeve 14 is normally functionally connected to the piston rod 10 by means of a resilient locking ring 15 in two annular grooves 16, 17 facing each other in the piston rod 10 and the sleeve 14, respectively. The function of the locking ring 15 will be described in further detail below. The sleeve 14 is partly guided for axial movements on the stationary member 5 but also within the piston rod 10. The force from the spring 13 transferred via the piston rod 10, the locking ring 15 and the piston rod sleeve 14 is transmitted to the force-transmitting part 6 by means of a spring ring 18 arranged in an annular groove in the part 6.

The intrusion of moisture, dirt and the like is effectively prevented by a bellows 19 covering the whole mechanism from the force-transmitting part 6 to the left in FIG. 1 to the actuator housing 7.

In FIG. 1 both the brake unit and the spring brake actuator are shown in their respective inactive conditions. For the spring brake actuator this means that the spring 13 is held compressed by brake fluid pressure acting to the right in FIG. 1 on the piston 9. It is obvious that if this fluid pressure is lowered, the force of the spring 13 will act on the outgoing force-transmitting part 6 via the spring ring 18, provided that the locking ring 15 is in its position shown in FIG. 1A axially locking the two members 10 and 14 together. By the provision of the spring ring 18 the brake unit itself can apply a brake force (by fluid pressure acting on the piston 1) via the force-transmitting part 6 without involving the spring brake actuator.

The locking ring 15 is slitted (or in other words of the circlip type), as appears in FIG. 2, and can be forced to expand radially from its rest position shown in FIGS. 1 and 2. This expanding force is accomplished by a tapered side surface cooperating with a corresponding tapered side surface of the groove 17 as most clearly shown in FIG. 1A. The depth of the groove 16 in the piston rod 10 is at least as great as the thickness or height of the locking ring 15. Accordingly the ring 15—if forced and allowed to expand—can be fully accomodated in said groove 16, unlocking the connection with the piston rod sleeve 14, which thus can move independently of the piston rod 10.

At either side of its slit the locking ring 15 is provided with a head 15' having an oblique or wedge-shaped external surface. The heads 15' extend into a compartment 20 in the piston rod flange 10'. A locking yoke 21 is arranged in this compartment 20 as well as a locking cube 22 above the yoke against the top wall of the compartment. The upper surface of the yoke 21 and the lower surface of the cube 22 are correspondingly oblique or wedge-shaped, as most clearly appears in FIG. 2. The wedge angle is comparatively small, as will be further described below. As shown in FIG. 2, the total height of the compartment 20 is such that the yoke 21—having inner surfaces conforming to the outer surfaces of the locking ring heads 15'—is held down over the heads, when the cube 22 is right over the yoke as illustrated.

By the provision of a groove and pin arrangement (not shown) the yoke 21 is guided for movements radially relative to the locking ring 15. As appears from FIG. 2, the cube 22 is movable perpendicularly relative to the direction of movement of yoke 21, and is attached to a control rod 23 extending out of the piston rod flange 10', in which it is situated. In an oblong hole in the end of the rod 23 a ring-shaped control lever 24 is attached. By this arrangement, the control rod 23 and thus the locking cube 22 can be moved to the right in FIG. 2 by depressing the control lever 24, so that the locking yoke 21 can move radially upwards in the compartment 20 leaving its engagement with the locking ring heads 15'. Hereby the locking ring 15 can be forced to expand radially into the piston rod groove 16 by its tapered side contacting the corresponding tapered surface of groove 17, thus allowing free relative axial movements between the piston rod 10 and the piston rod sleeve 14, which otherwise are locked together by the locking ring 15.

A return spring 25 of the helical compression type is arranged around the control rod 23 and exerts a biasing force to the left in FIG. 2 on the locking cube 22 for again placing it in locking position above the locking yoke 21.

Briefly stated, the aim of the mechanism having as its main component the locking ring 15 controlled by the parts 21–25 is to allow a discontinuation of the force transmission from the spring 13 to the part 6 via the sleeve 14 in spite of the fact that there is no fluid pressure available for compressing the spring 13 by pushing the spring brake piston 9 to the right in FIG. 1. Typically, such a situation occurs when worn-out brake pads shall be replaced or when a parked, braked vehicle equipped with a brake unit integrated with a spring brake actuator as shown in FIG. 1 is to be moved in the absence of brake fluid pressure. In such a case it is only necessary to manually push down the lever 24 so as to allow the locking ring 15 to be expanded into the groove 16, and the sleeve 14 together with the part 6 to be unloaded is released from the parking brake force of the spring 13. In this unloaded condition of the unit the return spring 4 is able to fully retract the brake unit piston 1 to the position to the left against the bottom of the actuator housing 7.

At the return of fluid pressure acting on the spring brake piston 9 the spring 13 will again be compressed.

When the two grooves 16 and 17 in the piston rod 10 and the piston rod sleeve 14, respectively, are again facing each other, the locking ring 15 will spring down in its groove 17. The return spring 25 pushes the locking cube 22 to the left in FIG. 2 thereby pushing down the locking yoke 21 into its locking position over the locking ring heads 15' as shown in FIG. 2. For this purpose the locking cube 22 and the locking yoke 21 have cooperating bevelled or slanted surfaces. When the different parts have re-assumed their positions shown in FIG. 2 (and FIG. 1), the working function of the unit has been restored, and it is important to notice that this restoration is completely automatic.

Besides the two basic requirements for the arrangement, namely to guarantee locking under normal circumstances (by the cube 22 and yoke 21) and automatic restoration of the working function after unlocking, an obvious requirement is that the manual release or unlocking can be performed with moderate effort. In a practical case the limit for the necessary pulling force in the control rod 23 in order to obtain manual release has been set to 200 N (including the counter-acting force of the return spring 25) at a parking brake force (force of the spring 13) of 25,000 N. It has been determined that this requirement can be safely met, as long as the friction coefficient within the arrangement is normal, i.e., below say 0.25.

As appears from the description above of the arrangement, the reaction force from the spring 13 is reduced in four steps to the desired low pulling force in the control rod 23; three of these steps are based on wedge action. Step 1 is the transformation of the axial force from the spring 13 acting on the locking ring 15 to a reduced radial force through the locking ring wedge surface. Step 2 is the transformation of the radial force in the locking ring 15 to a tangential force in the locking ring heads 15'; the force reduction obtained is constant and only depending on the geometrical relations. Step 3 is the transformation of the tangential force to a radial force on the locking yoke 21 obtained through the cooperating outer and inner surfaces, respectively, in the heads 15' and in the yoke 21. Step 4 is the transformation of the force in the radial or upwards direction in the yoke 21 to an axial force in the control rod 23 by the cooperating sloping surfaces on top of the yoke 21 and on the lower side of the locking cube 22, respectively.

The embodiment described above is the preferred one, but several other embodiments within the general inventive concept are feasible. Two such embodiments are illustrated in FIGS. 3 and 4 and FIGS. 5 and 6, respectively.

Figure 3:
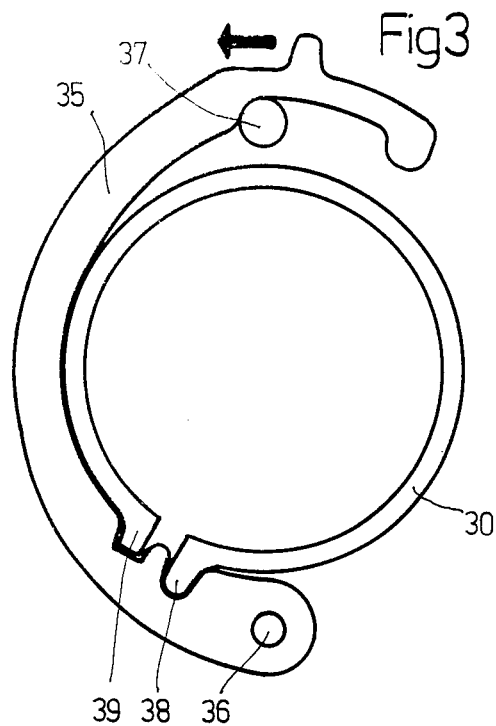
Figure 4:
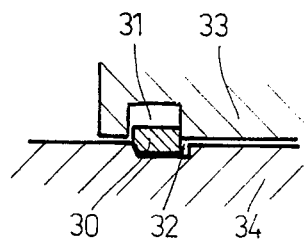

In the embodiment according to FIGS. 3 and 4 a locking ring 30 (completely corresponding to the locking ring 15 in the first embodiment) is arranged in two circumferential grooves 31 and 32 in two spring brake actuator parts 33 and 34, respectively. The locking ring 30 is slitted and has a bias to the position shown in FIGS. 3 and 4. By a wedged side it will be subjected to a force biasing it radially into the groove 31 in the part 33 if not held in position. This is performed by a circumferential control latch 35, which is pivotally mounted at a fixed point 36. The pivotal movement in the direction of the arrow in FIG. 3 is limited by a fixed pin 37 and a corresponding recess in the latch 35. Two notches are provided in the latch 35: a first one for a first head 38 on the with—locking ring 30 and a second one for a second head 39 thereon. The first head 38 is big enough never to leave its latch notch, when the latch 35 is manually transferred in the direction of the arrow, whereas the second head 39 in the corresponding situation will be free from the latch 35, so that the locking ring 30 can expand radially into the groove 31 and set the parts 33 and 34 free to move independently relative each other. The locking function of the locking ring 30 will be restored automatically, provided that a return spring force is exerted on the control latch 35 in the clockwise direction as viewed in FIG. 3.

Figure 5:
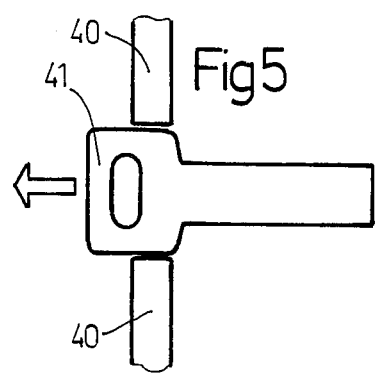
Figure 6:
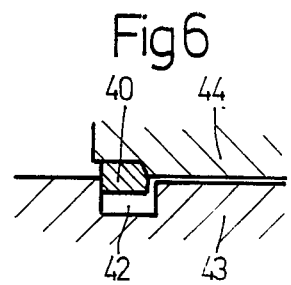

The basic principle of the embodiment according to FIGS. 5 and 6 is the same as that of the two previous ones with the slight difference that in this case a circumferential locking ring 40 is biassed radially inwards from its normal condition as shown in FIGS. 5 and 6, if a control slide 41 is manually pulled in the direction of the arrow in FIG. 5, so that the narrow part of the slide comes between the ends of the slitted ring 40. This means that the locking ring 40 in its unlocked condition will rest in a circumferential groove 42 in a spring brake actuator part 43 that is coaxially within another part 44. Also in this case the control slide 41 must be returned by spring force to its position shown in FIG. 5, in order to automatically restore the operating function of the spring brake actuator.

The spring brake actuator shown and described is combined with a brake unit, but it is to be understood that the invention is equally applicable to a spring brake actuator used alone, also as service brake actuator. The invention is likewise applicable to a spring brake actuator used for other purposes than on rail vehicles.

In some instances use has been made of expressions such as "upper", "lower" and the like, especially when reference in being made to FIG. 2. However, such expressions are not to be seen as limiting in any way; to the contrary the arrangement can be placed in any position without any drawback as to the proper function.

Modifications are possible within the scope of the appended claims.

What is claimed is:

1. A device for discontinuing and automatically restoring the operational function of a spring brake actuator, comprising: a piston having a piston rod including a first annular groove; spring means for urging the piston and piston rod in a working direction for brake application at falling brake fluid pressure on the piston; a piston rod sleeve coaxial with and slidable axially relative to the piston rod and having a second annular groove facing the first annular groove; a slitted, resilient locking ring positioned in the first and second grooves; at least one of the first and second grooves having a radial depth sufficient to fully receive the locking ring; and externally operable, spring-biased control means movable between a first position, in which the locking ring is constrained to rest in both of the first and second grooves so that the piston rod and piston rod sleeve are locked together, and a second position, in which the locking ring is received into only one of the grooves, which is at least as deep as the thickness of the ring, and is outside the other groove so that the piston rod and piston rod sleeve are free to move independently of each other.

2. A device according to claim 1, wherein at least one of the first and second grooves includes a tapered side surface and the locking ring has a tapered side surface cooperating with the tapered side surface of the groove.

3. A device for discontinuing and automatically restoring the operational function of a spring brake actuator, comprising: a piston having a piston rod including a first annular groove; spring means for urging the piston and piston rod in a working direction for brake application at falling brake fluid pressure on the piston; a piston rod sleeve coaxial with and slidable axially relative to the piston rod and having a second annular groove facing the first annular groove; a slitted, resilient locking ring positioned in the first and second grooves; externally operable, spring-biased control means movable between a first position, in which the locking ring is constrained to rest in both of the first and second grooves so that the piston rod and piston rod sleeve are locked together, and a second position, in which the locking ring is received into only one of the grooves, which is at least as deep as the thickness of the ring, and is outside the other groove so that the piston rod and piston rod sleeve are free to move independently of each other, wherein the locking ring includes ring heads at each side of the slit therein, and locking yoke means movable radially relative to the locking ring and engageable with the ring heads for keeping them together, and locking cube means movable substantially perpendicularly to the yoke for moving the yoke into engagement with the ring heads, the locking cube means carried in a compartment in the piston rod and radially opposite to the ring heads.

4. A device according to claim 3, wherein the compartment has a radial height sufficient to slidably receive the locking cube means for movement from a yoke release position to a yoke locking position.

5. A device according to claim 3, including control rod means attached to the locking cube means and extending out of the piston rod, and compression spring means arranged around the control rod means for providing a spring bias on the cube means into its yoke means locking position.

6. A device according to claim 5, wherein outer surfaces of the locking ring heads and corresponding opposed inner surfaces of the locking yoke means are oblique and an upper surface of the yoke means and a corresponding opposed lower surface of the locking cube means are oblique to obtain a force-reduction from the locking ring to the locking cube means and control rod means.

7. A device according to claim 3, wherein the locking yoke means and the locking cube means are each provided with corresponding opposed slanted surfaces.

* * * * *